US007446134B2

(12) United States Patent
Tsang et al.

(10) Patent No.: US 7,446,134 B2

(45) Date of Patent: Nov. 4, 2008

(54) POLYMERIC ADDITIVES TO IMPROVE PRINT QUALITY AND PERMANENCE ATTRIBUTES IN INK-JET INKS

(75) Inventors: Joseph W Tsang, Corvallis, OR (US); John R Moffatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 10/824,687

(22) Filed: Apr. 14, 2004

(65) Prior Publication Data

US 2004/0225031 A1 Nov. 11, 2004

Related U.S. Application Data

(63) Continuation-in-part of application No. 09/761,451, filed on Jan. 16, 2001, now abandoned.

(51) Int. Cl.
*C09D 11/00* (2006.01)

(52) U.S. Cl. ....................................... 523/160; 523/161

(58) Field of Classification Search ................. 523/160, 523/161

See application file for complete search history.

(56) References Cited

U.S. PATENT DOCUMENTS

| | | | | |
|---|---|---|---|---|
| 4,023,977 | A | | 5/1977 | Mercurio et al. |
| 4,538,160 | A | | 8/1985 | Uchiyama |
| 4,694,302 | A | | 9/1987 | Hackleman et al. |
| 4,694,303 | A | | 9/1987 | Morino et al. |
| 5,006,862 | A | | 4/1991 | Adamic |
| 5,623,294 | A | | 4/1997 | Takizawa et al. |
| 5,624,484 | A | | 4/1997 | Takashashi et al. |
| 5,640,187 | A | | 6/1997 | Kashiwazaki et al. |
| 5,723,179 | A | | 3/1998 | Wong et al. |
| 5,746,818 | A | | 5/1998 | Yatake |
| 5,814,685 | A | | 9/1998 | Satake et al. |
| 5,985,975 | A | | 11/1999 | Kurabayashi et al. |
| 6,000,793 | A | * | 12/1999 | Inamoto ..................... 347/101 |
| 6,087,051 | A | * | 7/2000 | Shoji et al. .................... 430/14 |
| 6,238,045 | B1 | | 5/2001 | Ono et al. |
| 6,268,101 | B1 | * | 7/2001 | Yacobucci et al. .......... 430/124 |
| 6,280,027 | B1 | | 8/2001 | Lawrence et al. |
| 6,312,858 | B1 | * | 11/2001 | Yacobucci et al. ............ 430/17 |
| 6,341,856 | B1 | | 1/2002 | Thompson et al. |
| 6,417,248 | B1 | | 7/2002 | Gore |

* cited by examiner

*Primary Examiner*—Edward J Cain

(57) ABSTRACT

Two-part fixatives are provided in conjunction with overcoating at least one ink-jet ink printed on a print medium and comprise (1) at least one first reactive component comprising a reactive monomer or oligomer, the reactive species selected from the group consisting of iso-cyanates and epoxy-terminated oligomers, optionally in a vehicle, and (2) at least one second component selected from the group consisting of polyols and polyvinyl alcohols, plus one or more base catalysts, optionally in a vehicle. The two components and catalyst(s) are deposited on the print medium on which the ink-jet ink has been printed, and react to form a hydrophobic polymer overcoating the printed ink and having a glass transition temperature within a range of −20° C. to +50° C. and a melting temperature within a range of 30° C. to 100° C.

22 Claims, No Drawings

POLYMERIC ADDITIVES TO IMPROVE PRINT QUALITY AND PERMANENCE ATTRIBUTES IN INK-JET INKS

CROSS-REFERENCE TO RELATED APPLICATION

The present application is a continuation-in-part of application Ser. No. 09/761,451, filed Jan. 16, 2001 now abandoned.

TECHNICAL FIELD

The present invention is directed to ink-jet inks, and, more particularly, to fixer compositions used in ink-jet printing to enhance printing performance, such as smearfastness, smudge resistance, and waterfastness.

BACKGROUND ART

There is a considerable demand in a better image quality of ink-jet. The low smearfastness, waterfastness, and the tendency to smudge seem to be the main drawbacks of ink-jet, and the teachings herein address these issues.

Several techniques has been used in the prior art to address these issues. One such technique is underprinting, which helps to stratify the colorant to the surface of the paper, reduce wicking, and improve color performance. Underprinting is defined as applying a fluid to the substrate prior the ink deposition. There are several patents addressing the technique of underprinting for better waterfastness and bleed control. The underlying idea in underprinting is to bind the dyes with oppositely charged species. For example, anionic dyes can be bound by a cationic polymer, and cationic dyes can be bound by an anionic polymer.

Overprinting with a clear fluid is also known. For example, it is known to overprint ink-jet inks with a clear fluid that comprises a fusible material and then fusing the printed image with a fuser in the ink-jet printer, much like the fuser of a laser printer. While this approach is certainly suitable for providing improved permanent images, it does require modification of an ink-jet printer.

A need remains for a method for improving smearfastness, waterfastness, and smudgefastness in ink-jet inks.

DISCLOSURE OF INVENTION

In accordance with the present teachings, two-part fixatives are provided in conjunction with overcoating at least one ink printed on a print medium. The two-part fixative consists essentially of (1) at least one reactive monomer or oligomer, the reactive monomer or oligomer selected from the group consisting of iso-cyanates and epoxy-terminated oligomers, optionally in a vehicle, and (2) at least one second component selected from the group consisting of polyols and polyvinyl alcohols, plus at least one base catalyst, optionally in a vehicle. The reactive monomer(s) or oligomer(s) is(are) contained separately from the second component(s). The reactive monomer(s) or oligomer(s) reacts with the second component (s) on the print medium to form a hydrophobic polymer overcoating the printed ink. The hydrophobic polymer has a glass transition temperature within a range of −20° C. to +50° C. and a melting temperature within a range of 30° C. to 100° C.

A method for printing on the print media is also provided, including printing at least one ink-jet ink on the print media and then depositing a fixative on the ink-jet ink(s). The method comprises:

- providing a first container containing the first reactive component(s);
- providing a second container containing the second component(s), plus at least one base catalyst;
- in either order, depositing the first reactive component(s) and the second reactive component(s) on the printed ink-jet ink; and
- allowing reaction to proceed between the first reactive component(s) and the second component(s) on the print media to form the hydrophobic polymer to thereby fix the ink-jet ink(s) on the print media.

Finally, a combination is provided, comprising the two-part fixative, and at least one ink-jet ink printed on the print media, the first reactive component(s) and the second reactive component(s) reacting on the printed ink-jet ink to form the hydrophobic polymer overcoating the ink-jet ink(s).

BEST MODES FOR CARRYING OUT THE INVENTION

Reference is now made in detail to a specific embodiment of the teachings herein, which illustrates the best mode presently contemplated by the inventors for practicing these teachings. Alternative embodiments are also briefly described as applicable.

Color inks in ink-jet typically have cyan, magenta and yellow colors. Accordingly, the primary colors are cyan, magenta and yellow (C, M, Y). Binary colors are their binary combinations, that is, blue B=C+M, red R=M+Y, and green G=Y+C. Composite black (Comp-K=C+M+Y) is the black color formed by printing cyan, yellow and magenta inks together. It differs from the true black ink (true K), which is often supplied by ink-jet printers as a separate ink cartridge. Thus, in conventional color ink-jet printing, there are four inks—cyan (C), yellow (Y), magenta (M), and black (K). The inks (C, Y, M) may be contained in compartments within a single cartridge, each ink being jetted through its own printhead or in separate cartridges. The black ink (K) may be included in yet another separate compartment in the same cartridge as the color inks (C, Y, M) or in a separate cartridge; in either event, it is jetted through its own printhead.

The inks comprise a vehicle and at least one colorant, as is well-known.

The vehicle comprises one or more co-solvents and water. The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, lactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methylpyrrolidone, 1,5-pentanediol, 2-pyrrolidone, diethylene glycol, 1,3-

(2-methyl)-propanediol, 1,3,5-(2-methyl)-pentanetriol, tetramethylene sulfone, 3-methoxy-3-methylbutanol, glycerol, and 1,2-alkyldiols.

The colorant(s) may comprise one or more dyes (water-soluble) or pigments (water-insoluble). If a pigment is employed, a dispersant is used to disperse the pigment in the vehicle. Alternatively, the pigment may be chemically treated to render it dispersible in the vehicle.

Additives, such as surfactants, biocides, pH adjusters, and the like may be added as appropriate. Such additives are well-known to those skilled in this art. The purity of all components is that customarily employed in ink-jet inks.

The use of fixative solutions in a fifth and/or sixth pen cartridge for overprinting printed ink to improve print quality and archivibility is disclosed herein. This enables a coating in overprinting that provides specific interactions between the colorants and the fixative polymers. Enhancement of the following printing attributes—waterfastness, smearfastness, and smudgefastness—is obtained.

The fifth pen is employed with one of the components of the fixative, preferably, the reactive component (monomer or oligomer discussed below). The other component of the fixative may be provided in one of the other ink compartments as part of the composition thereof or, more preferably, may be provided in a sixth pen.

In overprinting, a precise alignment of fixative and ink is not very important, so long as the fixative covers the printed ink. Thus, an ink-jet printhead is not necessary, although it can be used, if desired. Alternatively, a mechanical device that ejects fluid under pressure is employed, such as an atomizer or an air-brush. Since the fixative is clear, the fixative may be said to be deposited by a clear fluid deposition device, whether printhead, atomizer, air-brush, or other suitable system. Consequently, the use of fixative to cover the printed ink is alternatively referred to herein as overprinting or overcoating.

The two-part hydrophobic fixative systems taught herein comprise: (a) first reactive monomers or oligomers in the $5^{th}$ or $6^{th}$ pen cartridge and (b) one or more second components in either a color compartment or the other of the $5^{th}$ and $6^{th}$ pens. Examples include isocyanate (TDI or MDI) or epoxy-terminated oligomers in the $5^{th}$ or $6^{th}$ pen, and polyols or polyvinyl alcohols and a catalyst in the color cartridge or the other of the $5^{th}$ or $6^{th}$ pen. Polymerization takes place by mixing of solutions (a) and (b) during overprinting. Catalysts for isocyanate typically consist of amines and alkoxides, while amines, alkoxides, and metal ions are useful for epoxies. The resultant polymer that is formed is hydrophobic.

The fixative in the two-part system is solvent-based. Solvent-based systems refer to those where the component (a) or (b) is either soluble or dispersed in a vehicle consisting of one or more organic solvents. Examples of organic solvents include the following: (1) halogenated hydrocarbons such as dichloroethane, methylene chloride, perchloroethylene, trichloroethane, and trichloroethylene; (2) aliphatic hydrocarbons such as de-aromatized petroleum distillate, white spirit, and synthetics; (3) aromatic hydrocarbons such as heavy naphtha, solvent naphtha, toluene, trimethyl benzene, and xylene; (4) alcohols such as ethanol, isopropanol, n-propanol, n-butanol, sec-butanol, and diacetone alcohol; (5) esters such as ethyl acetate, ethyl lactate, and n-butyl acetate; (6) ethers such as ethylene glycol monomethyl ether, ethylene glycol monoethyl ether, ethylene glycol monopropyl ether, ethylene glycol monobutyl ether, and tetrahydrofuran; (7) ketones such as cyclohexanone, methyl ethyl ketone, and methyl isobutyl ketone; and (8) terpenes such as dipentene, terpineol, and terpentine. The concentration of each component (a) and (b) in the organic solvent(s), or vehicle, is within the range of about 0.1 to 100 wt %.

The components of the fixative system may also include one or more surfactants within the concentration range of about 0.1 to 20 wt %. The surfactant(s) is preferably organic solvent soluble, such as those with low ethylene oxide repeating units, available in the SURFYNOLS, TERGITOLS, and TRITONS series of surfactants. The SURFYNOLS are acetylenic ethoxylated diols available from Air Products, the TERGITOLS are polyethylene or polypropylene oxide ethers available from Union Carbide, and the TRITONS are alkyl phenyl polyethylene oxides available from Rohm & Haas Co. It is well-known in the art of coating industry, a mixture of the above are used to achieve the desired coating properties such as drying speed, coating uniformity, and glossiness.

The present teachings are directed to the use of a clear solution (fixer) to overcoat a printing page to enhance printing performance such as smearfastness, smudge, and waterfastness. The solution is delivered as fine aerosol using a pressurized apparatus such as an air-brush or atomizer onto printed pages as an overcoat. Therefore, it is also called a fixative solution or fixer.

The fixer solution consists of a two-part system, comprising (a) at least one reactive monomer or oligomer, the reactive monomer or oligomer selected from the group consisting of iso-cyanates and epoxy-terminated oligomers, optionally in a vehicle, and (b) at least one second component selected from the group consisting of polyols and polyvinyl alcohols, plus at least one base catalyst, optionally in a vehicle, where the base catalyst is present in an amount ranging from about 0.1 to 5 wt %. In one embodiment, the reactive monomer or oligomer may be contained in a separate cartridge from the ink-jet ink print cartridge(s), such as a $5^{th}$ pen, while the second component(s) may be contained in another separate cartridge from the ink-jet ink print cartridge(s), such as a $6^{th}$ pen. The reactive monomer or oligomer reacts with the second component (s) on the ink-jet printed print medium to form the hydrophobic polymer, which has a glass transition temperature within a range of −50° to +100° C. and a melting temperature within a range of 30° to 150° C., thereby fixing the printed ink.

For those skilled in the polymer science arts, it will be appreciated that the end group stoichiometries of monomer/oligomer and polyol are carefully balanced to attain a high molecular weight polymer (this implies high conversion of monomers). It is preferable to use a stoichiometric ratio of components a:b of 1:1; alternatively, an excess of polyol may be desirably employed to ensure essentially complete reaction of the monomer/oligomer.

If the fixer is not reactive toward the colorants, it serves as a hydrophobic overcoat against exposure to the environment including water and smear/smudge.

Enhancement of waterfastness, smearfastness, and smudgefastness is provided by use of the fixative solution in the present teachings.

There are several reasons why the in situ formation of a polymer, such as a urethane polymer from a two-part system is superior in ink-jet printing to the use of preformed polymers ("one-part system"):

(a) cross-linking is performed in place;

(b) topographical concerns of the print media surface;

(c) solubility of the monomers (isocyanates and polyols) is much easier to achieve than with the use of preformed polymers in the ink; and (d) variety of cross-linking monomers can be successively applied to the print sample.

With regard to aspects (a) and (b): With polymerization occurring on the adhering surface of the media, the overall binding of the polymer is enhanced. That is, as polymerization occurs, the crystalline structure of the polymer adapts to the crevices, fissures, and overall shape and form of the surface of the print media, thereby efficiently confining the colorant between the polymer and the media. This enhances the fastness properties of the colorant to the media, particularly the water fastness and smudge proofing of the colorant on the media, compared to a preformed polymer dissolved in the ink. In situations where a preformed polymer or a polymer already present in the ink or applied to the surface by a different pen, what usually occurs is that the dissolved polymer does not adhere efficiently and completely cover the media surface. Thus, the performance of the preformed polymer is not as good as the one polymerized on the surface of the media. However, it is not obvious what monomers to use such that the in situ polymerization reaction proceeds rapidly and extensively enough so that the monomers actually react on the surface of the media as desired to form polymer, rather than uselessly penetrating into the media matrix and not reacting.

With respect to aspect (c): Applicants' experience has been that the addition of polymers to thermally-fired ink-jet inks has disadvantageous rheological and surface-active properties. The shear rate of extruding drops from the orifices of ink-jet pens is extremely large. High molecular weight species do not obey Newtonian flow when subjected to these shear forces and, as a general result, aberrations in drop weight and trajectory occurs with their use. It is a general rule of thumb for those experienced in this art that it is rare that a naturally occurring or synthetic polymer can perform well in the presence of these extrusion forces. Usually, if polymers are present in the ink, pen drop ejection performance is compromised and requires extensive redesign of the ink-jet firing chamber and orifice structures to accommodate these polymers in the ink. Additionally, the decap or crusting performance is adversely affected with high molecular weight species. Thus, if a preformed polymer is to be used in the ink, it must not deteriorate pen performance. This severely limits the number of useable polymers in ink-jet inks. Simple molecules on the other hand, such as monomer precursors for polymers, have much lower molecular weights and depart less from Newtonian flow. Their use precludes extensive and costly re-design of pens. Thus, it is highly desirable to use simple, low molecular weight compounds in ink-jet compositions.

With regard to aspect (d): It would be advantageous to have several fixer pens to accomplish specialty fixing; that is, when the printed sample will (a) be exposed to the environments of extensive humidity, (b) be exposed to extreme amounts of ambient office light or sunlight, or (c) be subject to repetitive abrasion. Thus, having on hand for the end-user several fixer pens containing several various monomers, that when polymerized on the media solve these fastness issues, is highly desirable.

From the foregoing, it will be evident that it would not be readily apparent as to how to select the right conditions that must be determined empirically to achieve the desired effect.

EXAMPLES

A series of two-part fixer compositions (Component A and Component B), Examples 1-3, were prepared; these are listed in Table I below. Examples 1 and 3 bracket Example 2, and it is expected that the results observed with Example 2 are similar for Examples 1 and 3.

TABLE I

Two-Part Fixer Compositions

| | | Example 1 | Example 2 | Example 3 |
|---|---|---|---|---|
| Component A | Propylene glycol, MW 3000 | 60 wt % | 60 wt % | |
| | Hydroxyl-terminated polyester polyol* | | | 70 wt % |
| | glycerol | 10 wt % | 10 wt % | 10 wt % |
| | dimethyl-ethanolamine | | 3 wt % | |
| | Tetrahydrofuran | 30 wt % | 27 wt % | |
| | N-methyl pyrrolidone | | | 20 wt % |
| Component B | Polymer MDI** | 100 wt % | 100 wt % | 100 wt % |

*available from Dow Chemical as Tone 0201
**available from Dow Chemical as PAPI 2940

Ink was then printed on a variety of print media, using the two-part fixer composition listed in Example 2 above, where the ink either contained a black pigment (Example 4) or a water-soluble black dye (Example 5) and where Component A was in a fifth pen and Component B was in a sixth pen.

Several measurements were made. Table II below lists the results of the two-part fixer composition of Example 2. Comparative Examples 4a (black pigment) and 5a (water-soluble black dye) are provided. No fixer solution was employed in Comparative Examples 4a and 5a.

TABLE II

Results of One-Part Fixer Composition (Water-Based) vs Two-Part Fixer Composition with Black Inks

| | Print medium | Ink Example 4 | Comparative Ink Example 4a | Ink Example 5 | Comparative Ink Example 5a |
|---|---|---|---|---|---|
| Colorant | | Black pigment | Black pigment | Water-soluble black dye | Water-soluble black dye |
| Fixer solution | | Example 2* | No | Example 2* | No |
| Optical density (1) | GBND | 1.44 | 1.45 | 1.32 | 1.31 |
| Waterfastness (2) | GBND | 0 | 20 | 0 | 70 |
| | CDCY | 0 | 38 | 0 | 120 |
| | PMCY | 1 | 24 | 2 | 165 |
| Acid smearfastness (3) | GBND | 0 | 110 | 1 | 35 |
| | CDCY | 0 | 75 | 3 | 11 |

TABLE II-continued

| Results of One-Part Fixer Composition (Water-Based) vs Two-Part Fixer Composition with Black Inks | Print medium | Ink Example 4 | Comparative Ink Example 4a | Ink Example 5 | Comparative Ink Example 5a |
|---|---|---|---|---|---|
| | PMCY | 2 | 280 | 2 | 50 |
| Alkaline smearfastness (3) | GBND | 1 | 320 | 2 | 70 |
| | CDCY | 1 | 186 | 1 | 56 |
| | PMCY | 2 | 460 | 5 | 97 |

Notes:
GBND = Gilbert Bond; CDCY = Champion Datacopy; PMCY = Stora Papyrus Multicopy.
(1) Measured in optical density units.
(2) Amount of colorant transfer by dripping deionized water onto a printed pattern, 10 minutes after printing.
(3) Amount of colorant transfer by running aqueous based highlighter twice over printed pattern. Measured in milli-optical density units.
*Example 2 (two-part fixer composition) is from Table I above.

With regard to a measurement of waterfastness, smearfastness, and smudgefastness in Table II, a lower value of colorant transfer indicates a better result. Thus, it can be seen that for the three print media tested, waterfastness, smearfastness (both acid and alkaline), and smudgefastness were considerably improved using the fixer of the present invention as compared to printing with no fixer.

Ink was also printed on a variety of print media, using the two-part fixer composition listed in Example 2 above, where the ink either contained a water-soluble cyan dye, a water-soluble magenta dye, or a water-soluble yellow dye. Several measurements were then made, again as outlined above. For comparison, a one-part, solvent-based polymer fixer composition was used. The composition of the one-part fixer is listed in Table III below as Comparison Example 6.

TABLE III

| Composition of One-Part, Solvent-Based Polymer Fixer. | Comparison Example 6 |
|---|---|
| Polymer | 10 wt % SAA-100 |
| tetrahydrofuran | 90 wt % |

Note:
SAA-100 is poly(styrene-allyl alcohol), available from Arco Chemical.

Table IV below provides a comparison between the one-part, solvent-based polymer fixer composition listed as Ink Examples 6A (fixer composition Comparison Example 6 with water-soluble cyan dye), 6B (fixer composition Comparison Example 6 with water-soluble magenta dye), and 6C (fixer composition Comparison Example 6 with water-soluble yellow dye) and the two-part fixer composition of Example 2.

TABLE IV

| Results of of One-Part Fixer Composition (Solvent-Based) vs Two-Part Fixer Composition with Color Inks | Papers | Ink Example | Example 6A | Ink Example | Example 6B | Ink Example | Example 6C |
|---|---|---|---|---|---|---|---|
| Colorant | | Water-soluble cyan dye | Water-soluble cyan dye | Water-soluble magenta dye | Water-soluble magenta dye | Water-soluble yellow dye | Water-soluble yellow dye |
| Fixer solution | | Example 2* | Example 6** | Example 2* | Example 6** | Example 2* | Example 6** |
| Fixer parts | | 2 | 1 | 2 | 1 | 2 | 1 |
| Optical density (1) | HFDP | 1.1 | 1.1 | 1.1 | 1.1 | 1.1 | 1.2 |
| | LL | 1.4 | 1.5 | 1.2 | 1.3 | 1.5 | 1.4 |
| | KK | 1.5 | 1.5 | 1.2 | 1.2 | 1.4 | 1.4 |
| | UD | 1.8 | 1.7 | 1.5 | 1.5 | 1.8 | 1.8 |
| | HPBF | 1.9 | 2.0 | 1.4 | 1.5 | 1.7 | 1.8 |
| Waterfastness (2) | HFDP | 0 | 2 | 0 | 4 | 1 | 12 |
| | LL | 2 | 21 | 0 | 35 | 1 | 15 |
| | KK | 0 | 5 | 0 | 5 | 0 | 0 |

TABLE IV-continued

| | Papers | Ink Example | Example 6A | Ink Example | Example 6B | Ink Example | Example 6C |
|---|---|---|---|---|---|---|---|
| | | *Results of of One-Part Fixer Composition (Solvent-Based) vs Two-Part Fixer Composition with Color Inks* | | | | | |
| | UD | 0 | 2 | 0 | 0 | 0 | 0 |
| | HPBF | 0 | 1 | 1 | 1 | 0 | 0 |
| Alkaline smearfastness (3) | HFDP | 0 | 0 | 0 | 5 | NM (5) | NM |
| | LL | 0 | 1 | 0 | 0 | NM | N.M. |
| | KK | 0 | 0 | 0 | 2 | NM | N.M. |
| | UD | 0 | 0 | 0 | 0 | NM | N.M. |
| | HPBF | 0 | 0 | 0 | 1 | NM | N.M. |
| Smudgefastness (4) | HFDP | 0 | 5 | 1 | 8 | 1 | 2 |
| | LL | 0 | 0 | 3 | 12 | 1 | 18 |
| | KK | 1 | 2 | 0 | 5 | 0 | 0 |
| | UD | 0 | 2 | 0 | 18 | 0 | 0 |
| | HPBF | 0 | 1 | 0 | 1 | 0 | 0 |

Notes:
HFDP = Hammermill Fore DP; LL = SpectraTech Lustro Laser (Warren); KK = Kromekote 2000 IS cover (Champion); UD = Utopia Dull (Appleton); HPBF = Hewlett-Packard Professional Brochure and Flyer paper.
(1) Measured in optical density units.
(2) Amount of colorant transfer by dripping deionized water onto a printed pattern, 10 minutes after printing.
(3) Amount of colorant transfer by running aqueous-based highlighter twice over printed pattern. Measured in milli-optical density units.
(4) Amount of colorant transfer by dripping deionized water onto a printed pattern 10 minutes after printing, followed immediately by running a finger over the wetted area.
(5) NM = not meaningful.
*Example 2 (two-part fixer composition) is from Table I above.
**Comparison Example 6 (one-part solvent-based fixer composition) is from Table III above.

In both comparison tests, the two-part fixer was printed as follows: an overcoating on a printed sample was formed by first depositing a solution of Component A and followed immediately by Component B. The stoichiometry of hydroxyl groups in Component A used was 50% in excess relative to the isocyanate groups in Component B. Film formation occurred quickly as the polymerization took place. After 10 minutes, the print quality attributes were measured, as listed in Table IV above.

A review of the data presented in Table IV shows that, in general, the two-component fixer system provides results that are at least equivalent, and in many cases superior, to the one-component fixer system:

- Colorant=Black Pigment. With regard to the one-component, water-based fixer, the two-component system is seen to be superior in waterfastness on CDCY and PMCY media, superior in acid smearfastness on PMCY media, and superior in alkaline smearfastness on all three media (GBND, CDCY, PMCY). In the remaining cases tested, namely, the waterfastness (GBND) and acid smearfastness (GBND, CDCY), the results were essentially equivalent.
- Colorant=Water-Soluble Black Dye. With regard to the one-component, water-based fixer system, the two-component system is seen to be superior in all three tests (waterfastness, acid smearfastness, alkaline smearfastness) on all three print media (GBND, CDCY, PMCY).
- Colorant=Water-Soluble Cyan Dye. With regard to the one-component, solvent-based fixer system, the two-component system is seen to be superior in waterfastness on all five print media (HFDP, LL, KK, UD, HPBF), superior in alkaline smearfastness on one print media (LL), and superior in smudgefastness on four print media (HFDP, KK, UD, HPBF). In the remaining cases tested, namely, the alkaline smearfastness (HFDP, KK, UD, HPBF) and smudgefastness (LL), the results were essentially equivalent.
- Colorant=Water-Soluble Magenta Dye. With regard to the one-component, solvent-based fixer system, the two-component system is seen to be superior in waterfastness on three print media (HFDP, LL, KK), superior in alkaline smearfastness on three print media (HFDP, KK, HPBF), and superior in smudgefastness on all five print media (HFDP, LL, KK, UD, HPBF). In the remaining cases tested, namely, the waterfastness (UD, HPBF) and alkaline smearfastness (LL, UD), the results were essentially equivalent.
- Colorant=Water-Soluble Yellow Dye. With regard to the one-component, solvent-based fixer system, the two-component system is seen to be superior in waterfastness on two print media (HFDP, LL) and superior in smudgefastness on two print media (HFDP, LL). In the remaining cases tested, namely, the waterfastness (KK, UD, HPBF) and smudgefastness (KK, UD, HPBF), the results were essentially equivalent. The alkaline smearfastness is not meaningful for the water-soluble yellow dye, since the highlighter itself is yellow, and thus the yellow colorant transfer cannot be measured accurately.

Faster film formation on paper for the two-component fixer system, compared to the one-component fixer system, was also observed.

It is anticipated that solvent effects on the print quality are not substantial, because the vehicle solvent evaporates quite quickly. The major effect on the print image is from the polymer that forms. It will be appreciated by those skilled in this art that it is the in situ formation of a hydrophobic polymer that accounts for all the desired printing effects.

The difference in the vehicles is immaterial in illustrating the invention. The vehicles consist mostly of volatile components that quickly evaporate and it is expected that they are not a contributor to the enhanced image permanence attributes illustrated in Table IV, for example. The control is, in effect, Example 6 in Table IV.

The in situ formed polyurethane polymer (two-component fixer) should be much more hydrophobic than the preformed poly(styrene-allylalcohol) copolymer (one-component fixer). The polyurethane polymer is three-dimensional in that it is cross-linked as it polymerizes, and thus is much more resistant to mechanical abrasion and water penetration. Thus, the in situ formed polyurethane polymer is expected to give superior permanent image attributes than the preformed polymer.

INDUSTRIAL APPLICABILITY

The fixer compositions of the present invention are expected to find use in ink-jet printing.

Thus, there have been disclosed two-part fixer systems for overprinting in conjunction with ink-jet printing on print media. It will be readily apparent to those skilled in this art that various changes and modifications may be made, and all such changes and modifications are considered to fall within the scope of the appended claims.

What is claimed is:

1. A fixative for ink-jet printing, said fixative for overcoating at least one ink printed on a print medium, each said ink printed from a separate printhead, said fixative comprising a two-part system and consisting essentially of (1) at least one reactive oligomer, said reactive oligomer comprising at least one epoxy-terminated oligomer, optionally in a vehicle, and (2) at least one second component comprising at least one polyol plus at least one base catalyst, optionally in a vehicle, said at least one reactive oligomer contained separately from said at least one second component, said at least one reactive oligomer reacting with said at least one second component on said print medium to form a hydrophobic polymer overcoating said printed ink, said polymer having a glass transition temperature within a range of −50° C. to +100° C. and a melting temperature within a range of 30° C. to 150° C.

2. The fixative of claim 1 wherein at least three color inks are each associated with a separate printhead.

3. The fixative of claim 2 wherein said at least three color inks are cyan, yellow, and magenta.

4. The fixative of claim 2 wherein three color inks are associated with three separate printheads and one black ink is associated with a fourth separate printhead.

5. The fixative of claim 1 wherein said oligomer has a concentration within a range of about 0.1 to 100 wt %.

6. The fixative of claim 1 wherein said polyol has a concentration within a range of about 0.1 to 100 wt %.

7. The fixative of claim 1 wherein said polyol is reacted in a 1:1 stoichiometric ratio, or excess of said polyol, with said reactive oligomer.

8. A method for printing on a print media, including printing at least one ink-jet ink on said print media and then depositing a fixative on said at least one ink-jet ink, said method comprising:

providing a first container containing at least one first reactive component comprising at least one epoxy-terminated oligomer, optionally in a vehicle;

providing a second container containing at least one second component comprising at least one polyol, plus at least one base catalyst, optionally in a vehicle;

in either order, depositing said at least one first reactive component and said at least one second component on said printed ink-jet ink; and allowing reaction to proceed between said at least one first reactive component and said at least one second reactive component on said print media to form a hydrophobic polymer, said polymer having a glass transition temperature within a range of −50° C. to +100° C. and a melting temperature within a range of 30° C. to 150° C. to thereby fix said at least one ink-jet ink on said print media.

9. The method of claim 8 wherein at least three color inks, each associated with separate printheads, are provided.

10. The method of claim 9 wherein said at least three color inks are cyan, yellow, and magenta.

11. The method of claim 9 wherein three color inks associated with three separate printheads and one black ink associated with a fourth separate printhead are provided.

12. The method of claim 8 wherein said oligomer has a concentration in said first container within a range of about 0.1 to 100 wt %.

13. The method of claim 8 wherein said polyol has a concentration in said second container within a range of about 0.1 to 100 wt %.

14. The method of claim 8 wherein said polyol is reacted in a 1:1 stoichiometric ratio, or excess of said polyol, with said reactive oligomer.

15. The method of claim 8 wherein at least one of said at least one first reactive component and said at least one second component is printed through a printhead onto said printed ink-jet ink.

16. In combination, (a) a two-part fixative, including (1) at least one first reactive component comprising at least one epoxy-terminated oligomer, optionally in a vehicle, and (2) at least one second component comprising at least one polyol, plus at least one base catalyst, optionally in a vehicle; and (b) at least one ink-jet ink printed on a print media, said at least one first reactive component and said at least one second reactive component reacting on said printed ink-jet ink to form a hydrophobic polymer, said polymer having a glass transition temperature within a range of −50° C. to +100° C. and a melting temperature within a range of 30° C. to 150° C. to thereby fix said at least one ink-jet ink on said print media.

17. The combination of claim 16 wherein at least three color inks, each associated with separate printheads, are provided.

18. The combination of claim 17 wherein said at least three color inks are cyan, yellow, and magenta.

19. The combination of claim 17 wherein three color inks associated with three separate printheads and one black ink associated with a fourth separate printhead are provided.

20. The combination of claim 16 wherein said oligomer has a concentration within a range of about 0.1 to 100 wt %.

21. The combination of claim 16 wherein said polyol has a concentration within a range of about 0.1 to 100 wt %.

22. The combination of claim 16 wherein said polyol is reacted in a 1:1 stoichiometric ratio, or excess of said polyol, with said reactive oligomer.

* * * * *